United States Patent
Sudou et al.

(10) Patent No.: US 9,507,016 B2
(45) Date of Patent: Nov. 29, 2016

(54) PRECEDING VEHICLE SELECTION APPARATUS

(71) Applicant: DENSO CORPORATION, Kariya, Aichi-pref. (JP)

(72) Inventors: Takuma Sudou, Kariya (JP); Jin Kurumisawa, Obu (JP); Toyohito Nozawa, Aichi-ken (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/510,410

(22) Filed: Oct. 9, 2014

(65) Prior Publication Data

US 2015/0112580 A1 Apr. 23, 2015

(30) Foreign Application Priority Data

Oct. 10, 2013 (JP) .................................. 2013-212969

(51) Int. Cl.
*B60W 30/12* (2006.01)
*B60W 30/16* (2012.01)
(Continued)

(52) U.S. Cl.
CPC ........... *G01S 13/04* (2013.01); *B60K 31/0008* (2013.01); *B60W 30/16* (2013.01); *B60W 40/072* (2013.01);
(Continued)

(58) Field of Classification Search
USPC ....... 701/96, 300, 93, 301; 706/46; 180/169; 340/435; 342/70, 146, 75, 77, 139, 73
See application file for complete search history.

(56) References Cited

U.S. PATENT DOCUMENTS 6,812,883 B2 * 11/2004 Kumon ................... G01S 7/412
                                                   342/139
7,532,152 B1 * 5/2009 Yonak ............................. 342/70
(Continued)

FOREIGN PATENT DOCUMENTS

DE        102004005104 A1 * 8/2004 ............. G01S 13/72
EP            1592983 B1 * 6/2010
(Continued)

OTHER PUBLICATIONS

Flexible distance maintenance of autonomous vehicle in accordance with lane change of lateral position vehicle; Yun Sub Kim ; Jae SaekOh ; Jung Ha Kim; Ubiquitous Robots and Ambient Intelligence (URAI), 2014 11th International Conference on; DOI: 10.1109/URAI.2014.7057442; Publication Year: 2014 , pp. 316-320.*

(Continued)

*Primary Examiner* — Cuong H Nguyen
(74) *Attorney, Agent, or Firm* — Harness, Dickey & Pierce, P.L.C.

(57) ABSTRACT

In a preceding vehicle selection apparatus, for each object ahead, a relative position, a relative speed, and width information indicating a lateral width are determined. A lateral position of the object ahead with reference to a traveling direction of the own vehicle is corrected by using the width information of the object ahead. Based on the relative position of the object ahead of, which the lateral position has been corrected, an own vehicle lane probability is calculated for each object ahead. A preceding vehicle is selected from the objects ahead based on the calculated own vehicle lane probability. Based on a value of a correlated parameter that has correlation with error in the lateral position or error in the width information, a correction amount of the lateral position is reduced as error in the lateral position or error in the width information becomes large.

12 Claims, 7 Drawing Sheets

(51) Int. Cl.
| | |
|---|---|
| G01S 13/04 | (2006.01) |
| B60W 40/072 | (2012.01) |
| B60K 31/00 | (2006.01) |
| G01S 13/93 | (2006.01) |
| G01S 7/295 | (2006.01) |
| G01S 13/42 | (2006.01) |
| G01S 13/72 | (2006.01) |
| G01S 7/40 | (2006.01) |

(52) U.S. Cl.
CPC ............. *G01S 7/2955* (2013.01); *G01S 13/42* (2013.01); *G01S 13/723* (2013.01); *G01S 13/931* (2013.01); *B60K 2031/0016* (2013.01); *B60W 2550/141* (2013.01); *B60W 2550/146* (2013.01); *B60W 2550/302* (2013.01); *B60W 2550/306* (2013.01); *B60W 2550/308* (2013.01); *G01S 2007/403* (2013.01); *G01S 2013/9321* (2013.01); *G01S 2013/9325* (2013.01); *G01S 2013/9353* (2013.01); *G01S 2013/9367* (2013.01)

(56) References Cited

U.S. PATENT DOCUMENTS

| | | | | |
|---|---|---|---|---|
| 7,734,416 | B2* | 6/2010 | Yano et al. ................... | 701/301 |
| 7,830,242 | B2* | 11/2010 | Meister et al. ............ | 340/425.5 |
| 7,864,033 | B2* | 1/2011 | Imura et al. .................. | 340/436 |
| 7,904,246 | B2* | 3/2011 | Kondoh et al. ............... | 701/301 |
| 7,974,784 | B2* | 7/2011 | Moriizumi et al. .......... | 701/301 |
| 8,031,107 | B2* | 10/2011 | Sasabuchi ............. | G01S 13/588 342/104 |
| 8,305,254 | B2* | 11/2012 | Nanami .......................... | 342/70 |
| 8,538,675 | B2* | 9/2013 | Richardson ................... | 701/301 |
| 8,571,786 | B2* | 10/2013 | Iwasaki et al. ............... | 701/300 |
| 8,718,916 | B2* | 5/2014 | Suzuki ........................... | 701/300 |
| 8,781,644 | B2* | 7/2014 | Samukawa ........... | B60W 50/14 701/1 |
| 8,897,497 | B2* | 11/2014 | Shiraishi ............... | G01S 13/867 340/435 |
| 8,903,640 | B2* | 12/2014 | Caminiti et al. ............. | 701/301 |
| 9,285,467 | B2* | 3/2016 | Ishimori ................. | G01S 13/06 |
| 2004/0117090 | A1* | 6/2004 | Samukawa ........ | B60K 31/0008 701/45 |
| 2004/0150549 | A1* | 8/2004 | Kumon ................... | G01S 7/412 342/70 |
| 2006/0190175 | A1 | 8/2006 | Moriizumi et al. | |
| 2009/0187290 | A1* | 7/2009 | Moriizumi et al. .............. | 701/1 |
| 2010/0283663 | A1* | 11/2010 | Sasabuchi ............. | G01S 13/588 342/70 |
| 2015/0100217 | A1* | 4/2015 | Sudou et al. ................... | 701/96 |

FOREIGN PATENT DOCUMENTS

| | | | | |
|---|---|---|---|---|
| JP | 02000235699 A | * | 8/2000 | |
| JP | 02001034897 A | * | 2/2001 | |
| JP | 2001-283391 | | 10/2001 | |
| JP | 02004082912 A | * | 3/2004 | |
| JP | 2004-199512 | | 7/2004 | |
| JP | 2004-230947 | | 8/2004 | |
| JP | 2004-233275 | | 8/2004 | |
| JP | 2004233275 A | * | 8/2004 | ........... G01S 13/931 |
| JP | 02006056485 A | * | 3/2006 | |
| JP | 4184096 B2 | * | 11/2008 | |
| JP | 2009-014479 | | 1/2009 | |
| JP | 2009-059082 | | 3/2009 | |
| JP | 4904983 | | 1/2012 | |
| JP | 02013142975 A | * | 7/2013 | |
| JP | 2015072604 A | * | 4/2015 | |
| WO | WO 2004068165 A1 | * | 8/2004 | |

OTHER PUBLICATIONS

A microprocessor-based, vehicle lateral controller; Fenton, R.E. ; Murthy, S.S.; Vehicular Technology Conference, 1981. 31st IEEE vol. 31; DOI: 10.1109/VTC.1981.1622959; Publication Year: 1981, pp. 381-386.*

Predictive curve anticipation; Holzmann, F. ; Bellino, M. ; Sulzmann, A.; Vehicular Electronics and Safety, 2006. ICVES 2006. IEEE International Conference on; DOI: 10.1109/ICVES.2006. 371616; Publication Year: 2006 , pp. 361-366.*

A path planning achievement of car following in motion control via LiDAR sensing; Chan Wei Hsu ; Tsung Hua Hsu ; Chun Hsiung Chen ; Yung Yuan Kuo; Industrial Electronics and Applications (ICIEA), 2010 the 5th IEEE Conference on; DOI: 10.1109/ICIEA. 2010.5514860; Publication Year: 2010 , pp. 1411-1416.*

Implementation of car-following system using LiDAR detection; Chan Wei Hsu ; Tsung Hua Hsu ; Kuang Jen Chang; ITS Telecommunications (ITST), 2012 12th International Conference on; DOI: 10.1109/ITST.2012.6425157; Publication Year: 2012 , pp. 165-169.*

Infrared-based vehicular positioning with the automatic radiation-strength control; Po-Wen Lu ; Rongshun Chen; Intelligent Transport Systems, IET; vol. 8 , Issue: 3; DOI: 10.1049/iet-its.2012.0127; Publication Year: 2014 , pp. 273-285.*

A trajectory-based approach for the lateral control of car following systems; Gehrig, S.K. ; Stein, F.J.; Systems, Man, and Cybernetics, 1998. 1998 IEEE International Conference on; vol. 4; DOI: 10.1109/ICSMC.1998.726624; Publication Year: 1998 , pp. 3596-3601 vol. 4.*

Road marking detection using LIDAR reflective intensity data and its application to vehicle localization; Hata, A.; Wolf, D.; Intelligent Transportation Systems (ITSC), 2014 IEEE 17th International Conference on; Year: 2014 pp. 584-589, DOI: 10.1109/ITSC.2014. 6957753.*

Visual pose measurement system for VTOL UAV autonomous landing; Haiwen Yuan; Changshi Xiao; Yuanqiao Wen; Xiaochun Wu; Chunhui Zhou; Information and Automation, 2015 IEEE International Conference on; Year: 2015 pp. 1096-1103, DOI: 10.1109/ICInfA.2015.7279450.*

Bias correction using background stars for space-based IR tracking; Clemons, T.M.; Chang, K.C.; Information Fusion, 2009. FUSION '09. 12th International Conference on; Year: 2009; pp. 2028-2035.*

Estimation of preceding vehicle's driving state; H. Araki; Y. Hiroshima; T. Ito; Intelligent Transportation System, 1997. ITSC '97., IEEE Conference on; Year: 1997; pp. 242-247, DOI: 10.1109/ITSC. 1997.660482.*

Flexible distance maintenance of autonomous vehicle in accordance with lane change of lateral position vehicle; Yun Sub Kim; Jae SaekOh; Jung Ha Kim; Ubiquitous Robots and Ambient Intelligence (URAI), 2014 11th International Conference on; Year: 2014 pp. 316-320, DOI: 10.1109/URAI.2014.7057442.*

Lane tracking control in vehicle-following collision situations; C.-Y. Chan; H.-S. Tan; American Control Conference, 1999. Proceedings of the 1999; Year: 1999, vol. 5; pp. 3697-3701 vol. 5, DOI: 10.1109/ACC.1999.782456.*

Probabilistic error model for a lane marking based vehicle localization coupled to open source maps; Wenjie Lu; Sergio A. Rodriguez F.; Emmanuel Seignez; Roger Reynaud; 17th International IEEE Conference on Intelligent Transportation Systems (ITSC) Year: 2014; pp. 360-365, DOI: 10.1109/ITSC.2014.6957717.*

Office Action mailed Sep. 29, 2015 in the corresponding JP application No. 2013-212969 (in Japanese with English translation).

Office Action dated Dec. 17, 2015 in the corresponding Korean Application No. 10-2014-013570 (with English translation).

* cited by examiner

PRECEDING VEHICLE SELECTION APPARATUS

CROSS-REFERENCE TO RELATED APPLICATION

This application is based on and claims the benefit of priority from Japanese Patent Application No. 2013-212969, filed Oct. 10, 2013, the disclosure of which is incorporated herein in its entirety by reference.

BACKGROUND

1. Technical Field

The present invention relates to a technology for selecting a vehicle (preceding vehicle) that is traveling ahead of an own vehicle.

2. Related Art

As a technology for reducing operating load placed on a driver who is driving a vehicle, an inter-vehicle control apparatus is known. The inter-vehicle control apparatus detects a vehicle (preceding vehicle) that is traveling ahead of the own vehicle. The inter-vehicle control apparatus controls the vehicle speed and the like to maintain a certain distance between the own vehicle and the preceding vehicle, enabling the own vehicle to automatically track the preceding vehicle.

In this type of apparatus, a radar or the like is used to detect objects that are present ahead of the own vehicle. The preceding vehicle that should be tracked by the own vehicle is selected from among the detected objects. When making the selection, there is a technology (refer, for example, to JP-B-4904983) for improving determination accuracy regarding whether or not the detection result of a previous cycle and the detection result of a current cycle are based on the same vehicle. The technology uses, among a plurality of pieces of position information that are clustered as pieces of position information that are based on the same target, the position information indicating an end portion position of the target that is closest to the own vehicle (referred to, hereinafter, as an "end portion position information"), rather than the position information indicating another specific position (such as the center) of the target (referred to, hereinafter, as a "specific position information").

When determination is made regarding whether or not a target that is present ahead of a vehicle is a preceding vehicle based on position information of the target, use of the end portion position information can be considered to enable the determination to be made earlier. In other words, the end portion position indicated by the end portion position information is closer to the own vehicle than the specific position indicated by the specific position information. Therefore, determination of whether or not the object is present in the own vehicle lane can be made earlier.

As described above, individual pieces of position information that have been clustered for the same target are used as the end portion position information. However, the end portion position information can also be predicted from the specific position information and width information (lateral width of the area in which the clustered pieces of position information are present) of the target detected by a radar.

However, the specific position information (in particular, a lateral position indicating the position in the vehicle width direction) of the target detected by a radar or the like does not accurately indicate a specific position (such as the center of the vehicle). The specific position information varies. In addition, error in a predicted path on which the own vehicle travels increases as the distance increases. Error in the width information increases as the radius of curvature of the path decreases (becomes a sharp curve). Therefore, when the end portion position information predicted from the specific position information and the width information is used to select and cancel a preceding vehicle, a problem occurs in that erroneous selection easily occurs.

SUMMARY

It is thus desired to provide a technology in which erroneous selection is suppressed during selection of a preceding vehicle using position information of a target that has been corrected using width information.

An exemplary embodiment provides a preceding vehicle selection apparatus of the present invention that includes object detecting means, lateral position correcting means, own vehicle lane probability calculating means, preceding vehicle selecting means, and correction amount adjusting means.

The object detecting means detects an object ahead, which is an object that is present ahead of an own vehicle, and determines, for each object ahead, (i) a relative position and a relative speed in relation to the own vehicle and (ii) width information indicating the lateral width of the object ahead.

The lateral position correcting means corrects a lateral position of the object ahead with reference to a traveling direction of the own vehicle, using the width information of the object ahead.

The own vehicle lane probability calculating means calculates an own vehicle lane probability for each object ahead, based on the relative position of the object ahead of which the lateral position has been corrected by the lateral position correcting means. The own vehicle lane probability is a probability of the object ahead being present in the same lane as the own vehicle.

The preceding vehicle selecting means selects a preceding vehicle from the objects ahead, based on the own vehicle lane probability calculated by the own vehicle lane probability calculating means.

The correction amount adjusting means, based on a value of a correlated parameter that has correlation with error in the lateral position or error in the width information, reduces a correction amount of the lateral position as error in the lateral position or error in the width information becomes large.

In the preceding vehicle selection apparatus of the exemplary embodiment configured as described above, the own vehicle lane probability is calculated and the preceding vehicle is selected using the lateral position that has been corrected using the width information. In other words, a predicted position of a vehicle-width-direction end of the object ahead is used. Therefore, a vehicle that is entering or leaving the own vehicle lane can be determined at an early stage. As a result, selection of a preceding vehicle can be made earlier.

In addition, the correction amount of the lateral position is adjusted based on the correlated parameter having a correlation with error in the lateral position or error in the width information. Therefore, erroneous determination at long distances in which error in the lateral position tends to increase and on roads having a small radius of curvature can be suppressed while ensuring early determination at close distances.

In addition, the present invention can be actualized by various embodiments in addition to the above-described preceding vehicle selection apparatus. For example, the present invention can be actualized by a system of which the preceding vehicle selection apparatus is a constituent element, or a program enabling a computer to function as each means configuring the preceding vehicle selection apparatus.

DESCRIPTION OF THE EMBODIMENTS

An embodiment to which the present invention is applied will hereinafter be described with reference to the drawings.

An inter-vehicle control system 1 is mounted in an automobile. The inter-vehicle control system 1 controls the vehicle speed to maintain the inter-vehicle distance to a vehicle (preceding vehicle) traveling ahead of the own vehicle at a suitable distance.

Figure 1:
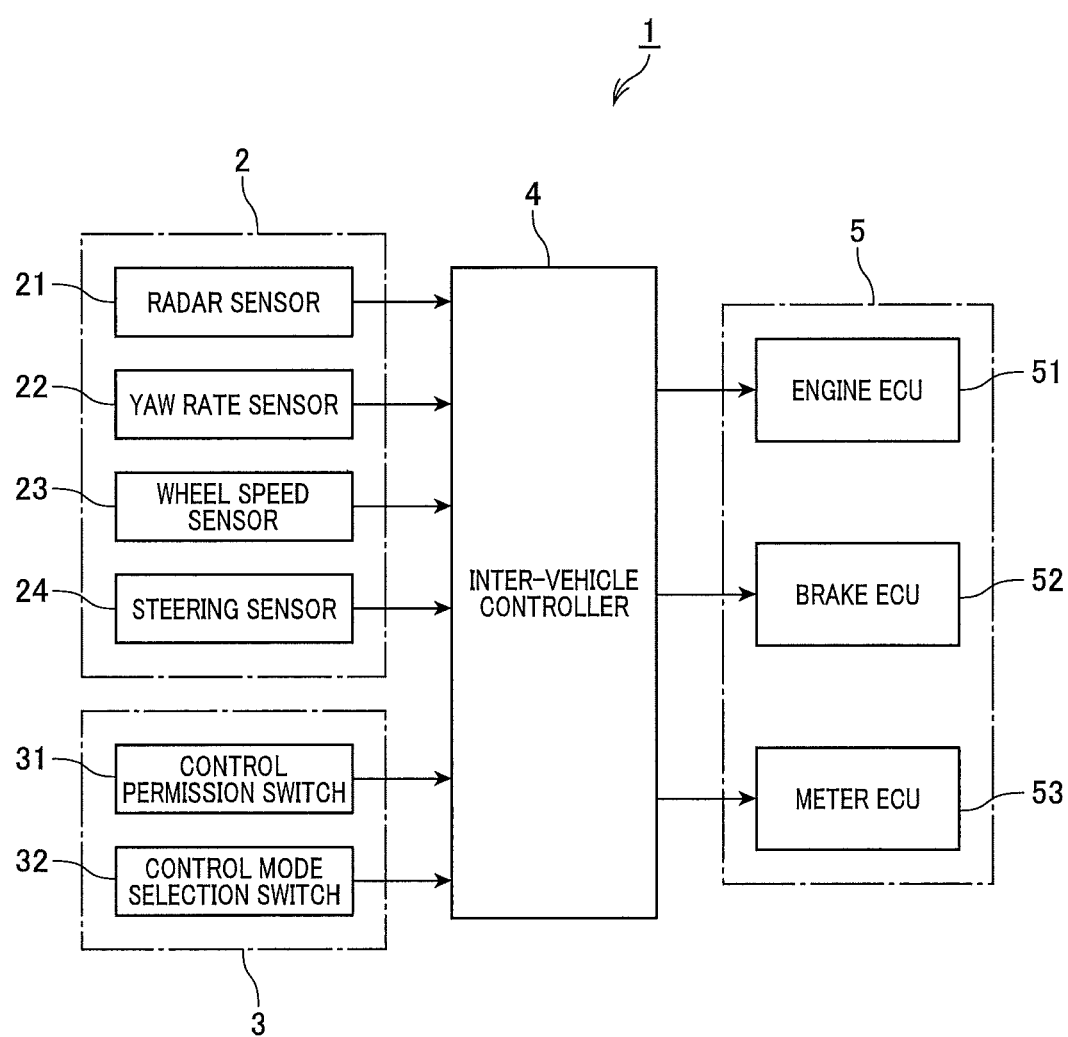
FIG. 1 is a block diagram of an overall configuration of an inter-vehicle control system including an inter-vehicle controller that is applicable to a preceding vehicle selection apparatus according to an embodiment.

As shown in FIG. 1, the inter-vehicle control system 1 is mainly configured by an inter-vehicle controller 4 that works as a preceding vehicle selection apparatus according to the embodiment. The inter-vehicle control system 1 also includes a sensor group 2, a switch group 3, and an electronic control unit (ECU) group 5. The sensor group 2 is composed of various sensors used to detect the situation surrounding the vehicle, as well as the behavior and state of the vehicle. The switch group 3 is composed of various switches used to input instructions to the inter-vehicle controller 4. The ECU group 5 performs various control operations based on commands from the inter-vehicle controller 4.

The sensor group 2 includes at least a radar sensor 21, a yaw rate sensor 22, a wheel speed sensor 23, and a steering sensor 24.

The radar sensor 21 outputs laser light towards the area ahead of the own vehicle so as to scan a predetermined angle range. The radar sensor 21 also detects reflected light of the laser light. The radar sensor 21 determines the distance to an object that has reflected the laser light based on the amount of time required for the laser light to reach and return from the object. In addition, the radar sensor 21 determines the direction in which the object is present based on the direction in which the laser light is irradiated when the reflected light is detected. The radar sensor 21 is not limited that which uses laser light. The radar sensor 21 may use millimeter waveband or micro-millimeter waveband radio waves, ultrasonic waves, or the like. Furthermore, a camera or the like may be used.

The wheel speed sensor 23 is attached to each of the left front wheel, the right front wheel, the left rear wheel, and the right rear wheel. Each wheel speed sensor 23 outputs a pulse signal having an edge (pulse edge) that is formed at every predetermined angle depending on the rotation of the wheel shaft. In other words, the wheel speed sensor 23 outputs a pulse signal having a pulse interval based on the rotation speed of the wheel shaft.

The steering sensor 24 outputs signals based on a relative steering angle of the steering wheel (amount of change in the steering angle) or an absolute steering angle of the steering wheel (actual steering angle with reference to the steering position when the vehicle is traveling straight ahead).

The switch group 3 includes at least a control permission switch 31 and a control mode selection switch 32.

The control permission switch 31 is used to input whether or not execution of adaptable cruise control (ACC) is permitted. ACC is a known control operation that enables the vehicle to travel at a predetermined set speed when a preceding vehicle is not present. ACC performs tracking cruise in which a predetermined inter-vehicle distance is maintained when a preceding vehicle is present.

The control mode selection switch 32 is used to select ACC control mode.

The ECU group 5 includes at least an engine ECU 51, a brake ECU 52, and a meter ECU 53.

The engine ECU 51 controls engine start/stop, fuel injection amount, ignition timing, and the like. The engine ECU 51 includes a central processing unit (CPU), a read-only memory (ROM), a random access memory (RAM), and the like. Specifically, the engine ECU 51 controls a throttle ACT based on detection values from a sensor that detects the depression amount of an accelerator pedal. The throttle ACT is an actuator that opens and closes a throttle provided in an air intake pipe. In addition, the engine ECU 51 controls the throttle ACT to increase and decrease the driving force of an internal combustion engine based on instructions from the inter-vehicle controller 4.

The brake ECU 52 controls braking of the own vehicle. The brake ECU 52 includes a CPU, a ROM, a RAM, and the like. Specifically, the brake ECU 52 controls a brake ACT based on detection values from a sensor that detects the depression amount of a brake pedal. The brake ACT is an actuator that opens and closes a pressure-increase regulating valve and a pressure-decrease regulating valve provided in a hydraulic brake circuit. In addition, the brake ECU 52 controls the brake ACT to increase and decrease braking force of the own vehicle based on instructions from the inter-vehicle controller 4.

The meter ECU 53 performs display control of a meter display that is provided in the vehicle, based on instructions from each unit of the vehicle including the inter-vehicle controller 4. The meter ECU 53 includes a CPU, a ROM, a RAM, and the like. Specifically, the meter ECU 53 displays, in the meter display, vehicle speed, engine rotation speed, and the execution state and control mode of control performed by the inter-vehicle controller 4.

The inter-vehicle controller 4 is mainly configured by a known microcomputer that includes a CPU, a ROM, a RAM, and the like. In addition, the inter-vehicle controller 4 includes a detection circuit, an analog/digital (A/D) conversion circuit, an input/output (I/O) interface, a communication circuit, and the like. The detection circuit and the A/D conversion circuit detect signals outputted from the sensor group 2 and convert the signals to digital values. The I/O interface receives input from the switch group 3. The communication circuit communicates with the ECU group 5. These hardware configurations are common. Therefore, detailed descriptions thereof are omitted.

Figure 8:
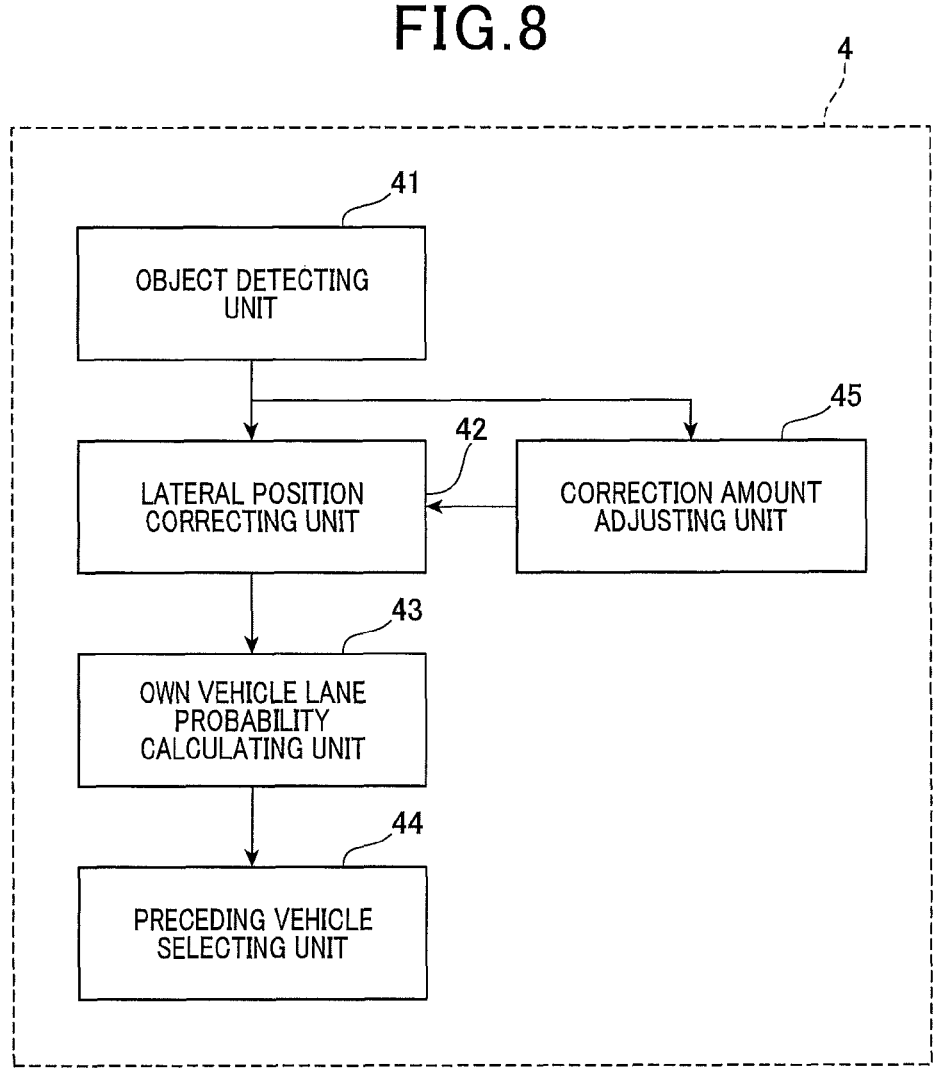
FIG. 8 is a block diagram showing a functional configuration of the inter-vehicle controller shown in FIG. 1.

In the inter-vehicle controller 4, the CPU executes one or more programs stored in advance in the memory (e.g., ROM) to perform a predetermined preceding vehicle determination process as described in detail below. Thus, as shown in FIG. 8, the inter-vehicle controller 4 is capable of working as the preceding vehicle selection apparatus that includes an object detecting unit 41 (equivalent to object detecting means), a lateral position correcting unit 42 (equivalent to lateral position correcting means), an own vehicle lane probability calculating unit 43 (equivalent to own vehicle lane probability calculating means), a preceding vehicle selecting unit 44 (equivalent to preceding vehicle selecting means), and a correction amount adjusting unit 45 (equivalent to correction amount adjusting means).

When ACC is permitted by the control permission switch 31, the inter-vehicle controller 4 periodically (such as every 100 ms) performs a preceding vehicle determination process. In addition, the inter-vehicle controller 4 performs an inter-vehicle control process selected by the control mode selection switch 32 using the determination result of the preceding vehicle determination process.

Of the processes, in the inter-vehicle control process, the inter-vehicle controller 4 ordinarily controls the vehicle speed by outputting instructions to increase and decrease the accelerator operation amount to the engine ECU 51. When control cannot be supported using the accelerator operation amount, the inter-vehicle controller 4 restricts the vehicle speed by outputting a brake command to the brake ECU 52. In addition, the inter-vehicle controller 4 outputs, to the meter ECU 53, various pieces of ACC-related display information and commands for generating an alert when predetermined conditions are met.

Figure 2:
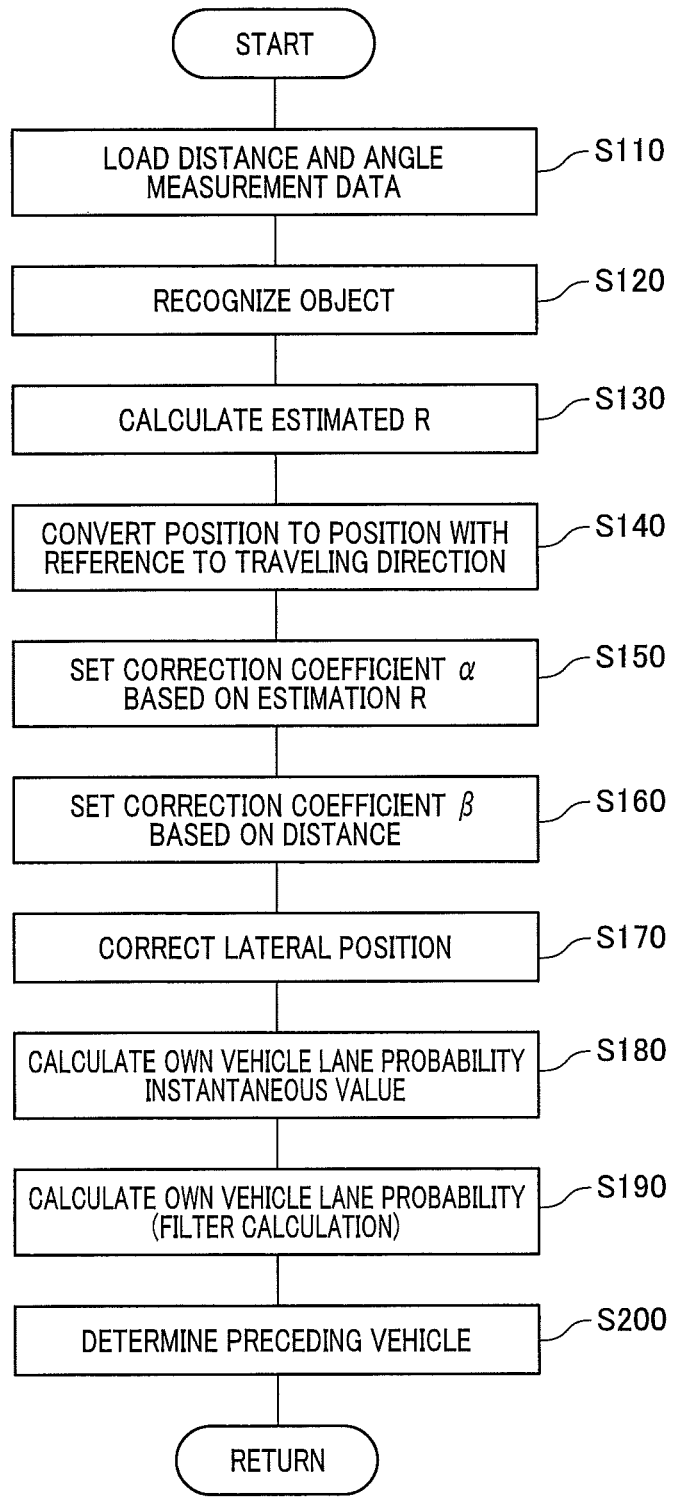
FIG. 2 is a flowchart of a preceding vehicle selection process performed by an inter-vehicle controller shown in FIG. 1.

Here, details of the preceding vehicle determination process performed by the inter-vehicle controller 4 will be described with reference to the flowchart shown in FIG. 2. In the embodiment, a program that enables the CPU of the inter-vehicle controller 4 to perform the preceding vehicle determination process shown in FIG. 2 is stored in the memory (e.g., ROM) of the inter-vehicle controller 4 in advance.

When the preceding vehicle determination process is started, first, at step S110, the inter-vehicle controller 4 loads the distance and angle measurement data detected by the radar sensor 21. The distance and angle measurement data indicate reflection positions of laser light.

At subsequent step S120, the inter-vehicle controller 4 converts the loaded distance and angle measurement data, from the polar coordinate system expressed by the data to an orthogonal coordinate system. Based on the converted data, the inter-vehicle controller 4 performs an object recognition process to recognize an object that is present ahead of the own vehicle.

Figure 7:
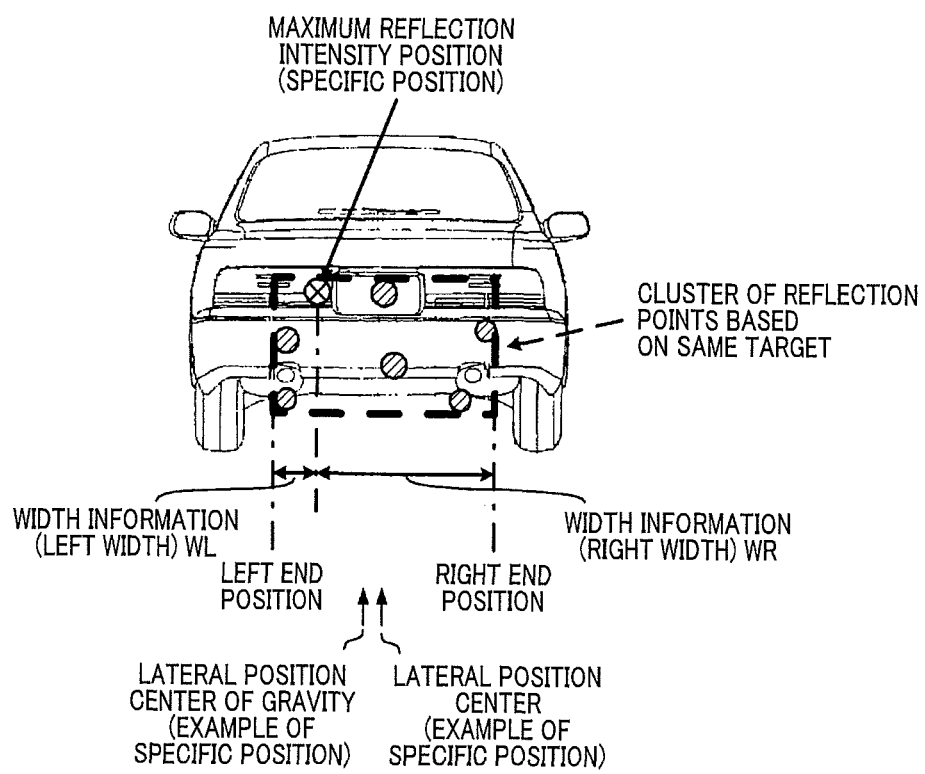
FIG. 7 is an explanatory diagram of a relationship between a reflection position detected by a radar sensor and specific position, width information and the like determined regarding a target.

In the object recognition process, as shown in FIG. 7, the inter-vehicle controller 4 clusters the distance and angle measurement data into one or more clusters of reflection points based on the same object (target). For each cluster, the inter-vehicle controller 4 then determines the coordinates of a specific position (here, a maximum reflection intensity position) of the object, width information WL and WR, the relative speed to the own vehicle, and the like. The width information WL and WR indicate the size of the cluster in the vehicle width direction.

Of the width information, WL indicates the width (left width) from the specific position to the left end position of the cluster. WR indicates the width (right width) from the specific position to the right end position of the cluster. The specific position is not limited to the maximum reflection intensity position. The specific position may be the center position or the center of gravity position of reflection points belonging to the cluster. Hereafter, the object (corresponding to an object ahead) recognized herein is referred to as a "target". The inter-vehicle controller 4 performs the processing operation at step S120, and then is capable of working as the object position detecting unit 41 in FIG. 8.

At subsequent step S130, based on the yaw rate γ detected by the yaw rate sensor 22 and the own vehicle speed V calculated based on the detection results from the wheel speed sensors 23, an estimation R is calculated based on the following expression (1). The estimation R is the curve radius (reciprocal of the curvature) of an own vehicle traveling curve.

$$R = \frac{V}{\gamma} \quad (1)$$

At steps S140 to S190 described hereafter, the same process is performed on all targets recognized at step S120 (object recognition process).

At subsequent step S140, the inter-vehicle controller 4 converts the specific position coordinates of the target to position coordinates under a premise that the traveling road on which the own vehicle is traveling is a straight road. The inter-vehicle controller 4 uses the estimation R calculated at step S130 to perform the conversion.

At this time, to simplify the process, the vehicle width direction is the X axis. The traveling direction of the vehicle perpendicular to the vehicle width direction is the Y axis. Only the position coordinate in the X axis direction (referred to, hereinafter, as a "lateral position") may be converted. In addition, the coordinate of the X axis is expressed by a negative value for the left side and a positive value for the right side, with the point of origin being a position that is the front of the own vehicle after conversion to a straight road.

At subsequent step S150, the inter-vehicle controller 4 determines a correction coefficient α (equivalent to a first correction coefficient) from the estimation R calculated at step S130, using an estimation R correction coefficient table that is set in advance. The correction coefficient α is a value from zero to one.

Figure 3:
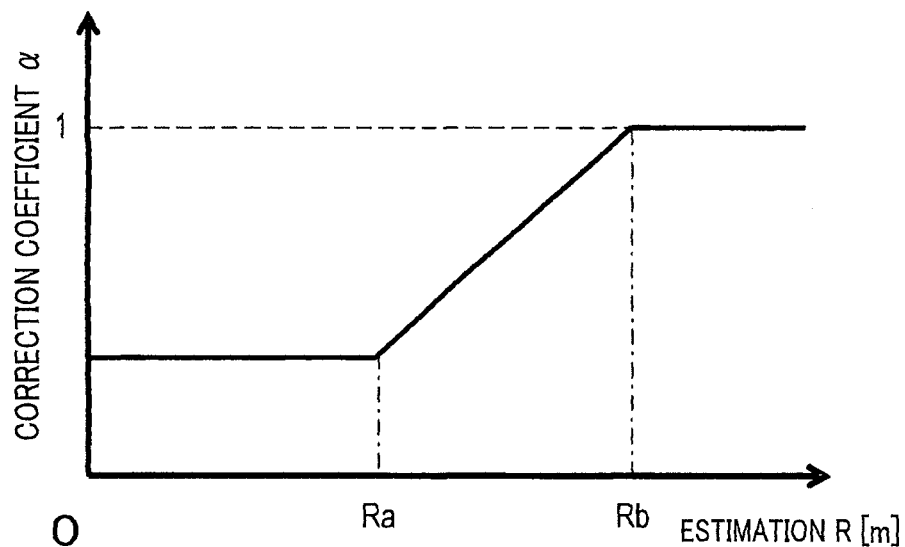
FIG. 3 is a graph showing the content of an estimation R correction coefficient table.

As shown in FIG. 3, the estimation R correction coefficient table is set so that the correction coefficient α is a predetermined lower limit value when the estimation R is less than a short threshold Ra. The correction coefficient α is a predetermined upper limit value when the estimation R is greater than a long threshold Rb. When the estimation R is the short threshold Ra or greater and the long threshold Rb or less, the correction coefficient α is set to increase from the lower limit value to the upper limit value as the estimation R increases.

At subsequent step S160, the inter-vehicle controller 4 determines a correction coefficient β (equivalent to a second correction coefficient) from the distance to the target obtained from the calculation result at step S120 (may be substituted with the position coordinate in the Y-axis direction). The correction coefficient β is a value from zero to one. The correction coefficient β is calculated using a distance correction coefficient table that is set in advance.

Figure 4:
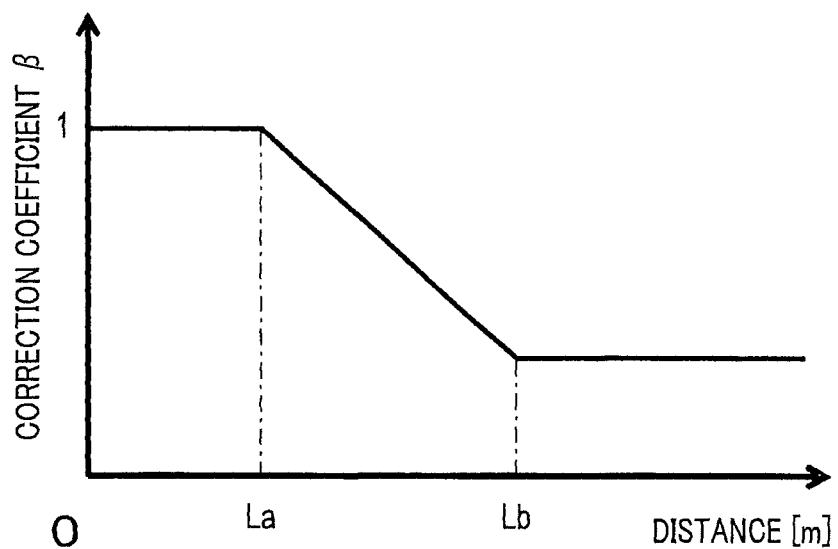
FIG. 4 is a graph showing the content of a distance correction coefficient table.

As shown in FIG. 4, the distance correction coefficient table is set so that the correction coefficient β is a predetermined upper limit value when the distance to the target is less than a close distance threshold La. The correction coefficient β is a predetermined lower limit value when the distance to the target is greater than a long distance threshold Lb. When the distance to the target is the close distance threshold La or greater and the long distance threshold Lb or less, the correction coefficient β is set to decrease from the upper limit value to the lower limit value as the distance to the target increases.

Here, the correction coefficient β is set based on the distance to the target. However, the correction coefficient β may be set based on an inter-vehicle time from the own vehicle to the target. The inter-vehicle time can be determined by dividing the distance between the own vehicle and the target by the own vehicle speed. In this instance, the correction coefficient table has similar tendencies as those of the correction table shown in FIG. 4. The inter-vehicle controller 4 performs the processing operation at steps S150 and S160, and then is capable of working as the correction amount adjusting unit 45 in FIG. 8.

At subsequent step S170, the inter-vehicle controller 4 corrects the lateral position X of the specific position coordinates after conversion that has been detected at step S140, based on the correction coefficients α and β determined at steps S150 and S160, and the width information WL and WR determined at step S120. The inter-vehicle controller 4 uses the following expression (2) for a target that is present on the left side of the front of the own vehicle. The inter-vehicle controller 4 uses the following expression (3) for a target that is present on the right side of the front of the own vehicle. The corrected lateral position is represented by Xr.

$$Xr = X + \alpha \times \beta \times WR \quad (2)$$

$$Xr = X - \alpha \times \beta \times WL \quad (3)$$

Figure 5:
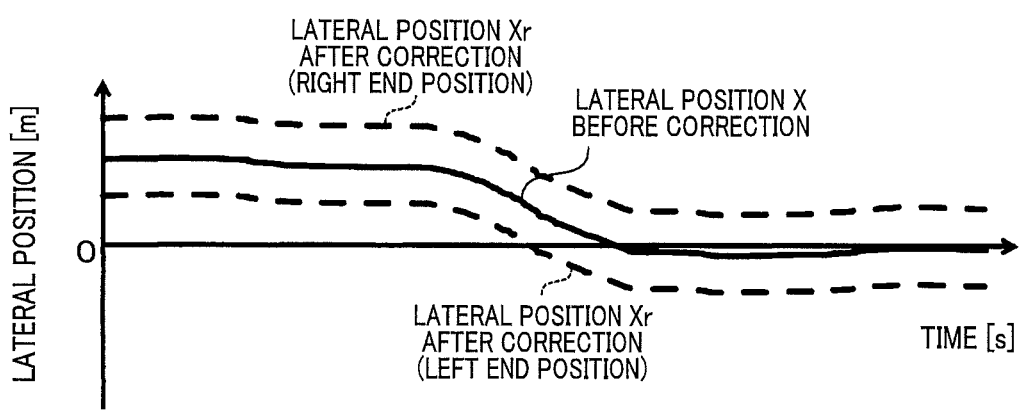
FIG. 5 is an explanatory diagram of the workings when a lateral position is corrected by width information.

As a result, when the target traveling ahead and to the right of the own vehicle changes vehicle lanes to the own vehicle lane, as shown in FIG. 5, the corrected lateral position Xr (here, the left end position) is detected at a position closer than the lateral position X before correction. The inter-vehicle controller 4 performs the processing operation at step S170, and then is capable of working as the lateral position correcting unit 42 in FIG. 8.

The specific position coordinates of the target which have been converted at step S140 and of which the lateral position has been corrected at step S170 are hereinafter referred to as "probability calculation position coordinates".

At subsequent step S180, the inter-vehicle controller 4 calculates an own vehicle lane probability instantaneous based on the probability calculation position coordinates. The own vehicle lane probability instantaneous value is calculated using an own vehicle lane probability map that is set in advance.

The own vehicle lane probability is a parameter indicating the likelihood of the target being a vehicle that is traveling in the same lane as the own vehicle. The own vehicle lane probability instantaneous value is an instantaneous value of the own vehicle lane probability calculated based on detection data in the current processing cycle. The own vehicle lane probability map is a known map in which the probability tends to be the highest when the probability calculation position coordinates are near the front of the own vehicle and at a close distance. In addition, the probability tends to decrease as the probability calculation position coordinates become farther and shifted in the lateral direction from the front of the own vehicle.

A specific example and usage of the own vehicle lane probability map are described in detail in JP-B-3427815 and the like. A reason for expressing whether or not the target is in the own vehicle lane in terms of probability is that an error is present between the curve radius of curvature (estimation R) determined from the yaw rate and the actual curve radius of curvature.

At subsequent step S190, the inter-vehicle controller 4 calculates an own vehicle lane probability. The own vehicle lane probability is calculated by the inter-vehicle controller 4 performing a filter calculation on the own vehicle lane probability instantaneous value determined at step S180. The own vehicle lane probability is used for determination of the preceding vehicle. The filter calculation is merely required to be that which works as a so-called low-pass filter. For example, a weighted average of the own vehicle lane probability instantaneous value and the own vehicle lane probability determined in the previous processing cycle may be performed. The inter-vehicle controller 4 performs the processing operation at steps S180 and S190, and then is capable of working as the own vehicle lane probability calculating unit 43 in FIG. 8.

At subsequent step S200, the inter-vehicle controller 4 determines the preceding vehicle based on the own vehicle lane probability calculated at step S190. The inter-vehicle controller 4 then ends the process. Specifically, for example, the inter-vehicle controller 4 determines a target having the shortest distance to the own vehicle, among the targets of which the own vehicle lane probability is a threshold (such as 50%) or higher, as the preceding vehicle. The inter-vehicle controller 4 performs the processing operation at step S200, and then is capable of working as the preceding vehicle selecting unit 44 in FIG. 8.

Then, the inter-vehicle controller 4 performs the inter-vehicle control process based on the distance to the target determined to be the preceding vehicle by the preceding vehicle determination process, and the relative speed of the target. The inter-vehicle controller 4 outputs various commands to the ECU group 5.

Figure 6:
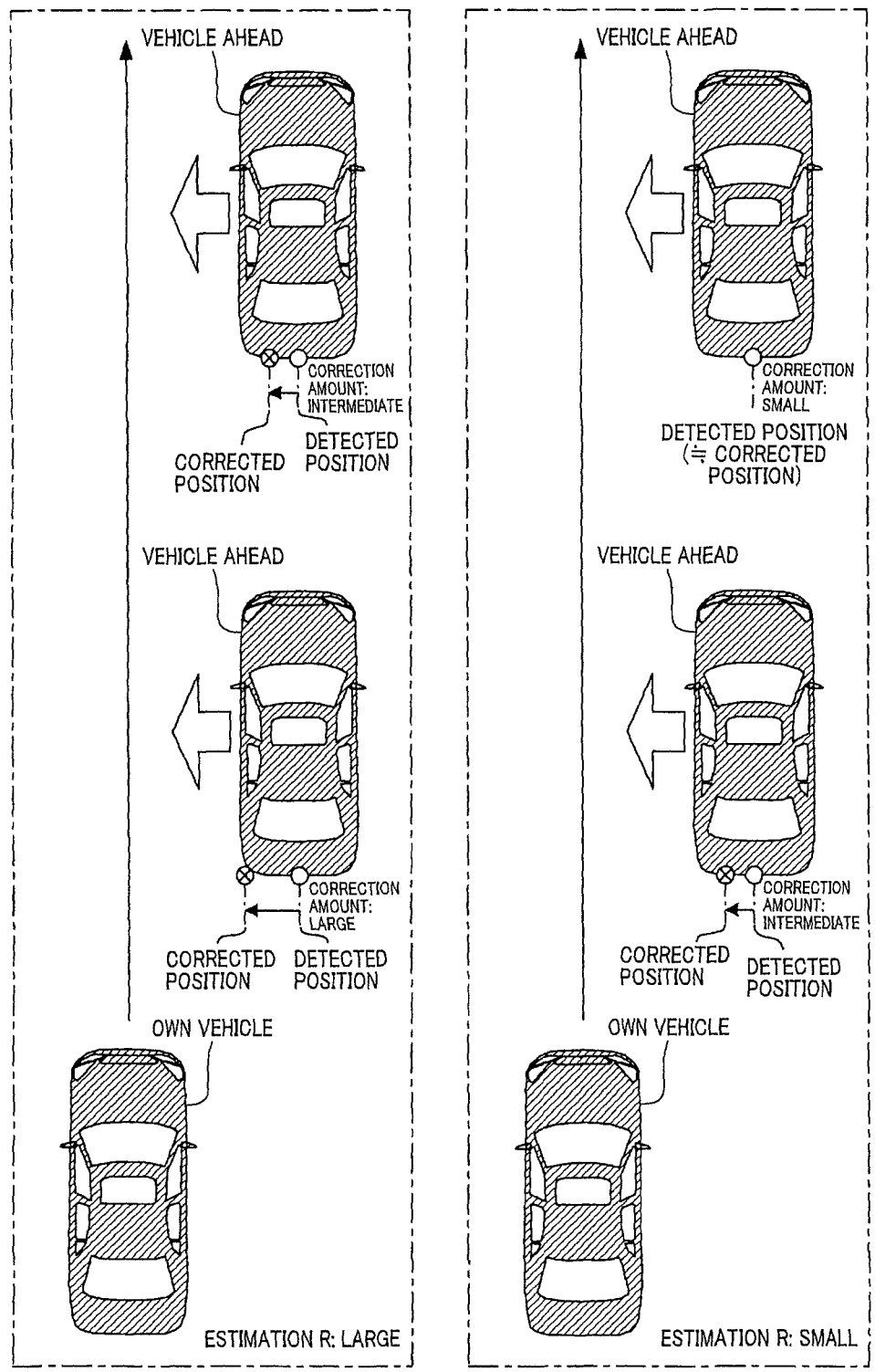
FIG. 6 is an explanatory diagram of an example of adjustment of correction amount based on correction coefficients.

As shown in FIG. 6, when the target (a vehicle traveling ahead) is attempting to change vehicle lanes from an adjacent vehicle lane to the own vehicle lane in a state in which the estimation R of the traveling road is large (almost a straight road), the coefficients α and β are both set to large values when the target is at a close distance. Therefore, the correction amount of the lateral position is large (the width information WL and WR are used for correction without restrictions). When the target is at a far distance, the coefficient α is set to a large value and the coefficient β is set to a small value. Therefore, the correction amount is a substantially intermediate value.

In addition, when the target is attempting to change vehicle lanes from an adjacent vehicle lane to the own vehicle lane in a state in which the estimation R of the traveling road is small (a sharp curve), the coefficient α is set to a small value and the coefficient β is set to a large value when the target is at a close distance. Therefore, the correction amount is substantially intermediate. The coefficients α and β are both set to a small value when the target is at a far distance. Therefore, the correction amount is small (substantially zero).

As described above, in the inter-vehicle control system 1, calculation of the own vehicle lane probability and selection of the preceding vehicle are performed using the lateral position Xr that has been corrected using the width information WL and WR, or in other words, the predicted position of the vehicle-width-direction end of the detected target (see FIG. 5). Therefore, a vehicle that is entering or leaving the own vehicle lane can be determined at an early stage. As a result, selection of the preceding vehicle can be made earlier.

In addition, the correction amount of the lateral position is adjusted so that the correction amount is reduced in a situation where errors are likely to increase. To make adjustments in this way, the correction coefficients $\alpha$ and $\beta$ are set based on the distance L to the target and the estimation R of the traveling road. The distance L is correlated with error in the lateral position X. The estimation R is correlated with error in the width information WL and WR. Therefore, erroneous determination in a state in which the distance to the target is far or the estimation R of the traveling road is small can be suppressed while ensuring early determination at a close distance.

(Other Embodiments)

An embodiment of the present invention is described above. However, the present invention is not limited to the above-described embodiment. It goes without saying that various embodiments are possible.

(1) According to the above-described embodiment, the estimation R is calculated from the yaw rate detected by the yaw rate sensor. However, the estimation R may be calculated from the steering angle detected by the steering sensor.

(2) According to the above-described embodiment, an example is given in which the present invention is applied to an inter-vehicle control system. However, this is not limited thereto. The present invention may be applied to any system as long as the system sets a preceding vehicle and performs control of some kind based on the state of the preceding vehicle or the relative state between the preceding vehicle and the own vehicle.

(3) The constituent elements of the present invention are conceptual and are not limited to those according to the present embodiment. For example, functions provided by a single constituent element may be dispersed among a plurality of constituent elements. Alternatively, the functions of a plurality of constituent elements may be integrated in a single constituent element. In addition, at least some of the configurations according to the above-described embodiment may be replaced with a known configuration having similar functions. In addition, at least some of the configurations according to the above-described embodiment may, for example, be added to or substituted for other configurations according to the above-described embodiment.

What is claimed is:

1. A preceding vehicle selection apparatus comprising:
    object detecting means that detects an object ahead of an own vehicle, and determines, for each object ahead, (i) a relative position and a relative speed in relation to the own vehicle and (ii) width information indicating a lateral width of the object ahead;
    lateral position correcting means that corrects a lateral position of the object ahead with reference to a traveling direction of the own vehicle, using the width information of the object ahead;
    own vehicle lane probability calculating means that calculates an own vehicle lane probability for each object ahead, based on the relative position of the object ahead of which the lateral position has been corrected by the lateral position correcting means, the own vehicle lane probability being a probability of the object ahead being present in the same lane as the own vehicle;
    preceding vehicle selecting means that selects a preceding vehicle from the objects ahead based on the own vehicle lane probability calculated by the own vehicle lane probability calculating means; and
    correction amount adjusting means that, based on a value of a correlated parameter that has correlation with error in the lateral position or error in the width information, reduces a correction amount of the lateral position as error in the lateral position or error in the width information becomes large.

2. The preceding vehicle selection apparatus according to claim 1, wherein
    the correction amount adjusting means uses, as the correlated parameter, at least one of (i) a curve radius of a traveling road on which the own vehicle is travelling, (ii) a distance between the own vehicle and the object ahead, and (iii) an inter-vehicle time from the own vehicle to the object ahead.

3. The preceding vehicle selection apparatus according to claim 1, wherein
    the lateral position correcting means corrects the lateral position by adding a correction value to the lateral position or subtracting the correction value from the lateral position, the correction value being a value that is obtained by multiplying the width information by a correction coefficient that is set to a value that is greater than zero and equal to or less than one.

4. The preceding vehicle selection apparatus according to claim 2, wherein
    the lateral position correcting means corrects the lateral position by adding a correction value to the lateral position or subtracting the correction value from the lateral position, the correction value being a value that is obtained by multiplying the width information by a correction coefficient that is set to a value that is greater than zero and equal to or less than one.

5. The preceding vehicle selection apparatus according to claim 4, wherein
    the correction coefficient includes a first correction coefficient and a second correction coefficient, the first correction coefficient being determined from the curve radius of the traveling road, the second correction coefficient being determined from (i) the distance between the own vehicle and the object ahead or (ii) the inter-vehicle time from the own vehicle to a current position of the object ahead.

6. The preceding vehicle selection apparatus according to claim 5, wherein:
    if the object ahead is present on a left side of a front of the own vehicle, the corrected lateral position is determined by $$Xr = X + \alpha \times \beta \times WR$$

where: X is a lateral position of the object ahead; $\alpha$ is the first correction coefficient; $\beta$ is the second correction coefficient; WR is the width information that indicates a width from a specific position of the object ahead to a right end position of the object ahead; and Xr is a corrected lateral position of the lateral position X; or
    if the object ahead is present on a right side of a front of the own vehicle, the corrected lateral position is determined by $$Xr = X - \alpha \times \beta \times WL$$

where: X is a lateral position of the object ahead; $\alpha$ is the first correction coefficient; $\beta$ is the second correction coefficient; WL is the width information that indicates a width from a specific position of the object ahead to a left end position of the object ahead; and Xr is a corrected lateral position of the lateral position X.

7. A preceding vehicle selection method comprising:

detecting, by a preceding vehicle selection apparatus, an object ahead being an object present ahead of an own vehicle, and determines, for each object ahead, (i) a relative position and a relative speed in relation to the own vehicle and (ii) width information indicating a lateral width of the object ahead;

correcting, by a preceding vehicle selection apparatus, a lateral position of the object ahead with reference to a traveling direction of the own vehicle, using the width information of the object ahead;

calculating, by a preceding vehicle selection apparatus, an own vehicle lane probability for each object ahead, based on the relative position of the object ahead of which the lateral position has been corrected, the own vehicle lane probability being a probability of the object ahead being present in the same lane as the own vehicle;

selecting, by a preceding vehicle selection apparatus, a preceding vehicle from the objects ahead based on the calculated own vehicle lane probability; and based on a value of a correlated parameter that has correlation with error in the lateral position or error in the width information, reducing a correction amount of the lateral position as error in the lateral position or error in the width information becomes large.

8. The preceding vehicle selection method according to claim 7, wherein at least one of (i) a curve radius of a traveling road on which the own vehicle is travelling, (ii) a distance between the own vehicle and the object ahead, and (iii) an inter-vehicle time from the own vehicle to the object ahead is used as the correlated parameter.

9. The preceding vehicle selection method according to claim 7, wherein the lateral position is corrected by adding a correction value to the lateral position or subtracting the correction value from the lateral position, the correction value being a value that is obtained by multiplying the width information by a correction coefficient that is set to a value that is greater than zero and equal to or less than one.

10. The preceding vehicle selection method according to claim 8, wherein the lateral position is corrected by adding a correction value to the lateral position or subtracting the correction value from the lateral position, the correction value being a value that is obtained by multiplying the width information by a correction coefficient that is set to a value that is greater than zero and equal to or less than one.

11. The preceding vehicle selection method according to claim 10, wherein the correction coefficient includes a first correction coefficient and a second correction coefficient, the first correction coefficient being determined from the curve radius of the traveling road, the second correction coefficient being determined from (i) the distance between the own vehicle and the object ahead or (ii) the inter-vehicle time from the own vehicle to a current position of the object ahead.

12. The preceding vehicle selection method according to claim 11, wherein:

if the object ahead is present on a left side of a front of the own vehicle, the corrected lateral position is determined by $$Xr = X + \alpha \times \beta \times WR$$

where: X is a lateral position of the object ahead; $\alpha$ is the first correction coefficient; $\beta$ is the second correction coefficient; WR is the width information that indicates a width from a specific position of the object ahead to a right end position of the object ahead; and Xr is a corrected lateral position of the lateral position X; or if the object ahead is present on a right side of a front of the own vehicle, the corrected lateral position is determined by $$Xr = X - \alpha \times \beta \times WL$$

where: X is a lateral position of the object ahead; $\alpha$ is the first correction coefficient; $\beta$ is the second correction coefficient; WL is the width information that indicates a width from a specific position of the object ahead to a left end position of the object ahead; and Xr is a corrected lateral position of the lateral position X.

* * * * *